United States Patent Office 3,810,915
Patented May 14, 1974

3,810,915
PROCESSES AND INTERMEDIATES FOR BENZINDENES
Andor Furst, Basel, Paul Buchschacher, Arlesheim, Dieter Kagi, Allschwil, Marcel Muller, Frenkendorf, Werner Meier, Bottmingen, and Erich Widmer, Arlesheim, Switzerland, assignors to Hoffmann-La Roche, Inc., Nutley, N.J.
No Drawing. Original application Nov. 19, 1969, Ser. No. 878,180, now abandoned. Divided and this application May 24, 1972, Ser. No. 256,555
Claims priority, application Switzerland, Nov. 19, 1968, 17,224/68
Int. Cl. C07d 13/04
U.S. Cl. 260—340.9                    1 Claim

ABSTRACT OF THE DISCLOSURE

Benz[e]indene derivatives and intermediates therefor have been prepared by various processes starting from hexahydroindane derivatives. The benz[e]indene end products belong to a known class of compounds and are useful as intermediates in the synthesis of steroidal compounds.

This is a division of application Ser. No. 878,180, filed Nov. 19, 1969 now abandoned.

BRIEF SUMMARY OF THE INVENTION

The invention relates to processes for preparing compounds of the formula

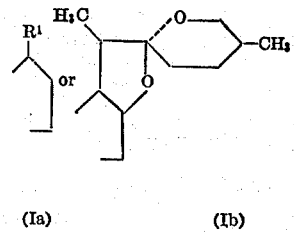

(I)

wherein R is hydrogen or a $C_{1-7}$ alkyl group and D represents one of the residues

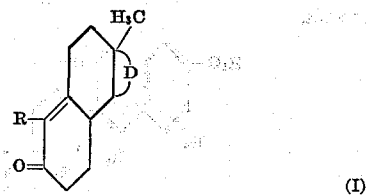

(Ia)            (Ib)

wherein $R^1$ is an acetyl group, which may be ketalized, a 1-hydroxyethyl or a 1-acyloxyethyl group.

In another aspect, the invention relates to novel intermediates.

DETAILED DESCRIPTION OF THE INVENTION

The present invention is concerned with a process for the manufacture of compounds of the general formula

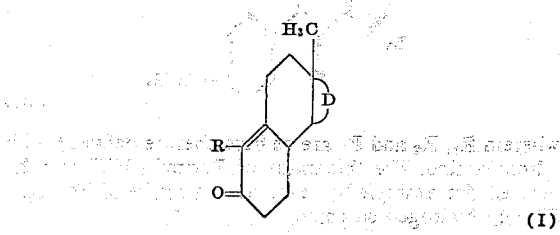

(I)

wherein R is hydrogen or a $C_{1-7}$ alkyl group and D represents one of the residues

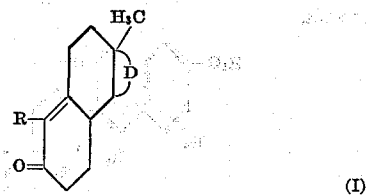

(Ia)            (Ib)

wherein $R^1$ is an acetyl group, which may be ketalized, a 1-hydroxyethyl or a 1-acyloxyethyl group.

The process in accordance with the invention comprises the cyclization of a compound of the general formula

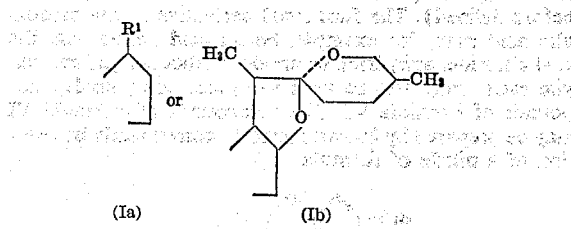

(II)

wherein X is oxygen or a $C_{1-8}$ alkylidene group; $R^2$, when X represents oxygen, is a group —$CH_2R$ and R has the above meaning, and, when X represents a $C_{1-8}$ alkylidene group, is a hydroxy or lower alkoxy group or halogen, and D has the same meaning as above.

A $C_{1-7}$ alkyl group represented in the foregoing formulae by the symbol R can be straight-chain or branched. Examples of such alkyl groups are methyl, ethyl, propyl, isopropyl or butyl and isomers thereof. R is preferably hydrogen or methyl. Examples of ketalized acetyl groups represented by the symbol $R^1$ are 1,1-(lower alkylenedioxy)-ethyl groups, especially the 1,1-ethylenedioxyethyl group. Examples of 1-acyloxyethyl groups are 1-(lower alkanoyloxy)-ethyl groups such as 1-acetoxyethyl; or 1-hydroxyethyl groups esterified with aromatic carboxylic acids such as 1-benzoyloxy-ethyl. A $C_{1-8}$ alkylidene group represented by the symbol X is preferably the methylene or ethylidene group. Further examples of such groups are propylidene, butylidene, 2-methylpropylidene or pentylidene. A lower alkoxy group represented by the symbol $R^2$ preferably contains 1-4 C-atoms; examples of such groups are especially methoxy and ethoxy. A halogen represented by $R^2$ is preferably chlorine.

The cyclization of a compound of Formula II to a compound of Formula I in accordance with the invention can be effected by treatment with alkaline or acidic condensation agents. Suitable alkaline condensation agents are alkali metal hydroxide solutions such as aqueous-alcoholic (especially aqueous-methanolic) caustic potash or organic bases such as pyrrolidine. Acidic condensation agents are organic acids, mineral acids and Lewis acids. As organic acids there can be used, for example, carboxylic acids such as acetic acid, or p-toluenesulfonic acid, and, when in a compound of Formula II X is alkylidene, an organic acid in admixture with an organic acid anhydride, especially acetic anhydride. Examples of suitable mineral acids are sulfuric acid, hydrohalic acids or phosphoric acids (especially polyphosphoric acid). Examples of suitable Lewis acids are zinc chloride or boron trifluoride. Further, treatment with cadmium alkyls is suitable for the cyclization of acid halides of Formula II.

The present invention is furthermore concerned with a process for the manufacture of the starting compounds of the general Formula II.

(a) According to one embodiment of this invention compounds of Formula II with X being oxygen can be prepared by reduction of a compound of formula (III)

wherein D has the above meaning, to a compound of formula (IV)

wherein D' represents a residue (Ib)   or   (Ic)

wherein R³ is a ketalized acetyl group, a 1-hydroxyethyl or a 1-acyloxy-ethyl group, cyclization of a compound of Formula IV to a compound of Formula V (V)

reaction of the compound of Formula V with an alkyl Grignard compound R²Mg-halogen (R² being a group —CH₂—R and R having the meaning given above) or with an alkyl-lithium compound R²Li to give a compound of formula (VI)

and oxidation of the compound of Formula VI thus obtained.

(b) According to another embodiment of this invention compounds of Formula II with X being oxygen and D having the above meaning can be prepared by cyclization of a compound of Formula III to a compound of formula (VII)

ketalization of a keto group which may be present in the residue D, reaction of a compound of formula (IX)

thus obtained, wherein D' has the meaning given above, with an alkyl Grignard compound R²Mg-halogen (R² being a group —CH₂—R and R having the above meaning), hydrolysis, and, if desired, cleavage of a ketal group which may be present in the ring D'.

(c) According to another embodiment of this invention compounds of Formula II with X being oxygen can be prepared by ketalization of the ring-located keto group and of a keto group which may be present in the residue D of a compound of Formula III, reaction of the thus obtained ketal with an alkyl-lithium compound R²Li, wherein R² is a group —CH₂—R and R has the above meaning, and subsequent cleavage of the ketal group(s).

(d) According to another embodiment of this invention compounds of the Formula II with X being oxygen can be prepared by ketalization of the ring-located keto group and of a keto group which may be present in the residue D of a compound of Formula III, conversion into an acid amide, reaction of the acid amide thus obtained with an alkyl Grignard compound R²Mg-halogen (R² representing a group —CH₂—R and R having the above meaning), hydrolysis and cleavage of the ketal group(s).

(e) According to another embodiment of this invention compounds of Formula II with X being oxygen can be prepared by ketalization of the ring-located keto group and of a keto group which may be present in the residue D of a compound of Formula III, transformation of the carboxy group into a cyano group, reaction of the nitrile thus obtained with an alkyl Grignard compound R²Mg-halogen (R² representing a group —CH₂—R and R having the above meaning), acidic hydrolysis and cleavage of the ketal group(s).

(f) According to another embodiment of this invention compounds of Formula II with X being oxygen can be prepared by ketalization of the ring-located keto group and of a keto group which may be present in the residue D of a compound of Formula III, transformation of the carboxy group into a cyano group, transformation of the cyano group of the compound thus obtained into an aldehyde group, reaction of the aldehyde thus obtained with an alkyl Grignard compound R²Mg-halogen (R² representing a group —CH₂—R and R having the above meaning), hydrolysis, cleavage of the ketal group(s), and subsequent oxidation.

(g) According to another embodiment of this invention compounds of Formula II with X being oxygen can be prepared by ketalization of the ring-located keto group and of a keto group which may be present in the residue D of a compound of Formula III, transformation of the carboxy group into an acid halide group, transformation of the acid halide group of the compound thus obtained into an aldehyde group, reaction of the aldehyde with an alkyl Grignard compound R²Mg-halogen (R² representing a group —CH₂—R and R having the above meaning), hydrolysis, cleavage of the ketal group(s), and subsequent oxidation.

(h) According to another embodiment of this invention compounds of Formula II with X being oxygen can be prepared by ketalization of the ring-located keto group and of a keto group which may be present in the residue D of a compound of Formula III, transformation of the carboxy group of the ketal into an acid halide group, reaction of the acid halide thus obtained with a dialkylcadmium compound, hydrolysis and cleavage of the ketal group(s).

(i) According to another embodiment of this invention compounds of Formula II with X being oxygen can be prepared by esterification of the carboxy group of a compound of Formula III, ketalization of the ring-located keto group, reduction of a keto group which may be present in the residue D, acidic hydrolysis, cyclization, reaction with a Grignard compound R²Mg-halogen (R² representing a group —CH₂—R and R having the above meaning), and, if desired, subsequent esterification of a hydroxy group present in the residue D or cleavage of a ketal group which may be present.

(k) According to another embodiment of this invention compounds of Formula II with X being an alkylidene group and R² representing a hydroxy or lower alkoxy group can be prepared by esterification of the carboxy group of a compound of the formula

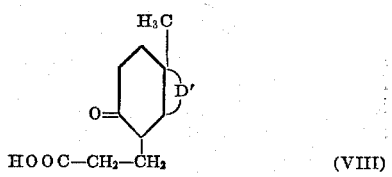

HOOC—CH₂—CH₂        (VIII)

wherein D' has the meaning given above, reaction of the compound thus obtained with an alkylidene phosphorone according to Wittig and, if desired, saponification of the ester group to form the initially present carboxy group and/or cleavage of a ketal group which is present in the residue D'.

(l) According to another embodiment of this invention compounds of Formula II with X being an alkylidene group and R² representing a halogen can be prepared by esterification of the carboxy group of a compound of the formula

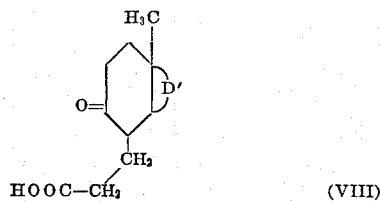

HOOC—CH₂        (VIII)

wherein D' has the above meaning, reaction of the compound thus obtained with an alkylident phosphorane according to Wittig, saponification of the ester group to form the initially present carboxy group and transformation of the acid into an acid halide, as well as cleavage, if desired, of a ketal group present in residue D'.

The reduction of a compound of Formula III to a compound of Formula IV in accordance with embodiment (a) can be effected with complex metal hydrides such as diisobutyl aluminum hydride, sodium borohydride, or with sodium and alcohol. Sodium borohydride is preferred. Condensation agents such as acetic anhydride/pyridine, sulfuric acid, polyphosphoric acid or zinc chloride are suitable for the cyclization of a compound of Formula IV thus obtained to a compound of Formula V.

When using acetic anhydride/pyridine a hydroxy group in the residue D' will be acetylated simultaneously. The reaction of a compound of Formula V with an alkyl Grignard or alkyl-lithium compound to give a compound of Formula VI can be carried out in a manner known per se. Chromium trioxide is particularly suitable as an oxidizing agent for the subsequent oxidation of a compound of Formula VI to a compound of Formula II. Cleavage of the ketal group can be effected in a manner known per se in an acidic medium.

The cyclization of a compound of Formula III to a compound of Formula VII which is to be carried out in accordance with embodiment (b) can be carried out in the same manner as the cyclization of a compound of Formula II to a compound of Formula I described above. The ketalization of a keto group which may be present in the residue D can be effected by reaction with an alcohol, especially with methanol, ethylene glycol or with a phenol such as pyrocatechol. The reaction of a compound of Formula VII with an alkyl Grignard compound can be carried out in a manner known per se. The hydrolysis of the compound obtained can be achieved by means of ammonium chloride solution or water. The cleavage of a ketal group which may be present in the residue D can be carried out in a known manner in an acidic medium.

According to embodiment (c), a compound of Formula III in ketalized form is converted into a compound of Formula II by reaction with an alkyl-lithium compound of the formula R²Li. It is of advantage to work in the presence of an ether such as diethyl ether or tetrahydrofuran as solvent at elevated temperature, expediently at the reflux temperature of the mixture. The preceding ketalization of the ring-located keto group and of a keto group which may be present in the residue D as well as the cleavage of the ketal group(s) to be carried out after the reaction can be carried out in the usual way as already described.

According to embodiment (d), an ester (e.g. the methyl ester) of a compound of Formula III is expediently subjected to ester-aminolysis after preceding ketalization of the ring-located keto group and of a keto group which may be present in the residue D: The ester which is to be reacted is allowed to react with ammonia in a solvent, expediently in a lower alkanol, advantageously at elevated temperature. The resulting acid amide is reacted with an alkyl Grignard compound R²Mg-halogen. The reaction product is subsequently hydrolyzed (e.g. by addition of aqueous ammonium chloride or water) and the ketal group is cleaved under acidic conditions.

According to embodiment (e), first the ring-located keto group and the keto group which may be present in the residue D are ketalized in a known manner. Then the carboxy group of a compound of Formula III is transformed into a cyano group, which can be done preferably with chlorosulfonyl isocyanate. The nitrile obtained is subsequently reacted with an alkyl Grignard compound R²Mg-halogen in a known manner. Then hydrolysis is carried out in acidic milieu and cleavage of the ketal group(s) under acidic conditions as well.

According to embodiment (f), the carboxyl group of a compound of Formula III, after ketalization of the ring-located keto group and of a keto group which may be present in the residue D is converted into a cyano group as described under (e). A reducing agent such as aluminum diisobutyl hydride can advantageously be used for the reduction of the cyano group to an aldehyde group. It is expedient to work in a solvent such as benzene or heptane. The aldehyde group is further converted into a secondary alcohol function by means of an alkyl Grignard compound R²Mg-halogen and subsequent hydrolysis of the product which is formed. The cleavage of the ketal group(s) is effected as described under (e) in acidic milieu, cyclization taking place simultaneously. The oxidation to a compound of Formula II is suitably effected with chromium trioxide.

According to embodiment (g), the carboxyl group of a compound of Formula III, after ketalization of the ring-located keto group and of a keto group which may be present in the residue D is transformed into an acid chloride function, with reagents such as oxalyl chloride or phosphorus trichloride. It is of advantage to work under mild conditions, expediently in a weakly acidic range and somewhat below room temperature. A solvent such as benzene is advantageously used. The acid halide is further converted into an aldehyde, for example, by reaction with a reagent such as ethyleneimine in the presence of an organic base (e.g. an amine such as triethylamine) to the corresponding acid amide which can then be converted into the aldehyde by reduction, advantageously with lithium aluminum hydride. The further reaction-steps to the compound of Formula III, which are formation of secondary alcohol, cyclization and oxidation of the latter, is described under (f).

According to embodiment (h), the carboxy group of a compound of Formula III, after ketalization of the ring-located keto group and of a keto group which may be present in the residue D is firstly transformed into an acid halide, which step has already been described under (g) This acid halide is then converted into a ketone by reaction with a dialkyl-cadmium compound (e.g. dimethyl-cadmium), which reaction is carried out expediently in a solvent such as a mixture of ether/benzene. The organo metallic complex is subsequently hydrolyzed, strongly acidic conditions being avoided. Finally cleavage of the ketal groups is effected in a known manner.

According to embodiment (i), a compound of Formula II which is used as the starting material is prepared by esterifying the carboxy group of a compound of Formula III. In this case preparation of the methyl ester is preferred which can be done by reaction of the acid with diazomethane. The ester is then ketalized selectively, which can be brought about, for example by only allowing the ketalizing agent to act until the ring-located keto group has reacted. Reducing agents such as sodium borohydride or tri-tert-butoxy lithium aluminum hydride are expediently used for the reduction of the keto group which may be present in the residue D. Subsequently the ester is saponified to the free keto-carboxylic acid under acidic conditions and cyclized to the enol-lactone by treatment with sodium acetate/acetic with simultaneous acetylation of a hydroxy group present in the residue D. Reaction with a Grignard compound $R^2$Mg-halogen, hydrolysis with water or aqueous ammonium chloride and if necessary re-acetylation with acetic anhydride/pyridine yields a compound of Formula II.

According to embodiment (k), a starting compound of Formula II in which X is an alkylidene group and $R^2$ represents a hydroxy or alkoxy group is prepared by esterifying a compound of Formula VIII. Preferably, the methyl or ethyl ester is prepared, advantageously the former, which can be done, for example, by reaction of the acid with diazomethane. The ester is then reacted with an alkylidene phosphorane according to Wittig at elevated temperature in a solvent, such as dimethyl sulfoxide or an ether, for example tetrahydrofuran or diethyl ether. Subsequently the ester can be resaponified.

According to embodiment (l), a starting compound of Formula II in which X is an alkylidene group and $R^2$ represents halogen is prepared by esterifying a compound of Formula VIII, reacting the ester with an alkylidene phosphorane according to Wittig and resaponifying the ester as already described in embodiment (k). The free acid is then converted into an acid halide, which can be effected by reaction with reagents such as oxalyl chloride or phosphorus trichloride under mild conditions, as described in embodiment (g).

The tricyclic compounds of the general Formula I which can be prepared in accordance with the invention are useful as intermedates for the manufacture of corresponding tetracyclic compounds of the steroid series.

The formation of the steroid A-ring can be achieved, for example, by hydrogenation of the double bond of a compound of the general Formula I and subsequent reaction of the hydrogenation product with, for example, methyl vinyl ketone according to methods which are known per se.

The starting compounds of Formula III, as far as not already known, can be prepared by methods known per se, for example, by chemical or microbiological degradation of ring D of tetracyclic steroids which are substituted accordingly. A compound of Formula III with a residue D of the Formula Ib can be prepared, for example, from diosgenin by treatment with a culture of *Proactinomyces restrictus* Turfitt CBS 157.45.

All temperatures in the following examples are given in degrees centigrade.

EXAMPLE 1

1.1 g. of crude 1-(1,1-ethylenedioxyethyl)-7a-methyl-5-oxo-4-(3-oxopentyl)-hexahydroindane are stirred with a solution of 3 g. of potassium hydroxide in 100 ml. of methanol and 10 ml. of water for 15 hours at room temperature. The reaction mixture is poured onto ice-water and extracted with ether. The ethereal extract is washed neutral with water, dried and evaporated. Chromatography of the residue on silica gel yields pure 3-(1,1-ethylenedioxyethyl) - 3a,6-dimethyl-7-oxo-1,2,3,3a, 4,5,8,9,9a,9b-decahydro-7H-benz[e]indene.

The indane derivative which is used as the starting material can be prepared as follows:

26.6 g. of 1-acetyl-4-(2-carboxyethyl)-7a-methyl-5-oxohexahydroindane and 6 g. of sodium acetate are dissolved in 400 ml. of acetic anhydride and heated at reflux under nitrogen for 2 hours. The reaction mixture is then evaporated in vacuum, the residue is twice evaporated with toluene and disolved in 1 liter of methylene chloride. The solution is washed with water, dried over sodium sulfate and evaporated in vacuum. The residue is recrystallized from ether and yields 7-acetyl-6a-methyl-3 (2H)-oxo-1,6,6a,7,8,9,9a,9b - octahydro - cyclopenta[f][1]benzopyran. 24.8 g. of the foregoing compound are dissolved in 300 ml. of methylene chloride. The solution is treated with 500 ml. of ethylene glycol, 130 ml. of orthoformic acid ethyl ester and 950 mg. of p-toluenesulfonic acid monohydrate and heated to reflux under nitrogen for 3.5 hours. After cooling, the reaction mixture is poured onto 3 liters of ice-water which contain 420 mg. of sodium hydrogen carbonate and extracted with methylene chloride. The organic phase is washed with water, dried over sodium sulfate and evaporated in vacuum. The residue is dissolved in benzene and chromatographed on 700 g. of silica gel. Elution with hexane/ether (3:1) yields 7-(1,1-ethylenedioxyethyl)-6a-methyl-3(2H)-oxo - 1,6,6a,7,8,9,9a,9b - octahydro-cyclopenta[f][1]benzopyran which is recrystallized from ether/isooctane. A solution of ethyl magnesium bromide prepared from 545 mg. of ethyl bromide in 30 ml. of ether is slowly added to a solution of 1.08 g. of 7-(1,1-ethylenedioxyethyl)-6a-methyl-3(2H) - oxo - 1,6,6a,7,8,9,9a,9b-octahydro-cyclopenta[f][1]benzopyran in 50 ml. of ether at 0°. The solution is held at 0° for 15 hours, then decomposed with 15 ml. of saturated ammonium chloride solution. The ethereal solution is washed with water and dried with sodium sulfate and evaporated in vacuum, yielding crude 1-(1,1-ethylenedioxyethyl)-7a-methyl-5-oxo-4-(3-oxopentyl)-hexahydroindane.

EXAMPLE 2

3-(1-hydroxyethyl)-3a,6-dimethyl - 7 - oxo-1,2,3,3a,4, 5,8,9,9a,9b-decahydro-7H-benz[e]indene is obtained from 1-(1-acetoxyethyl)-7a - methyl-5-oxo - 4-(3-oxopentyl)-hexahydroindane by treatment with aqueous-methanolic caustic potash in accordance with Example 1.

The indane derivative which is used as the starting material can be prepared as follows:

A solution of 1 g. of 1-acetyl-4-(2-carboxyethyl-7a-methyl-5-oxo-hexahydroindane in 100 ml. of isopropanol is treated with 1 g. of sodium borohydride and stirred at room temperature for 3 hours. The reaction mixture is then diluted with a large amount of water, made acidic with hydrochloric acid and extracted with methylene chloride. The organic extract is washed neutral with water, dried with sodium sulfate and evaporated to dryness in vacuum. The residue thus obtained is dissolved in a mixture of 30 ml. of acetic acid anhydride and 30 ml. of pyridine. This solution is held at room temperature for 20 hours and subsequently evaporated to dryness. For the removal of excess acetic acid, acetic acid anhydride and pyridine, the residue is repeatedly evaporated with toluene. 1.1 g. of 7-(1-acetoxyethyl)-6a-methyl-3-oxo-perhydro-cyclopenta[f][1]benzopyran are obtained.

5 g. of the foregoing compound are dissolved in 100 ml. of dry benzene and treated under nitrogen with a Grignard solution prepared from 8.8 g. of ethyl bromide, 2 g. of magnesium and 75 ml. of ether. The reaction mixture is heated to reflux for 18 hours, then treated with dilute hydrochloric acid, washed with water and dried over sodium sulfate. Crystallized from ether-isopropyl ether, the residue yields 3.2 g. of 3-ethyl-3-hydroxy-7-(1 - hydroxyethyl) - 6a-methyl-perhydro-cyclopenta[f][1]benzopyran.

A solution of 2.0 g. of the foregoing compound in 30 ml. of acetic anhydride and 30 ml. of pyridine is allowed to stand at room temperature for 3 hours. The reaction mixture is then poured onto ice-water and extracted with ether. The ethereal solution is washed with water, dried over sodium sulfate and evaporated. 7-(1-acetoxyethyl)-3-ethyl - 3 - hydroxy-6a-methyl-perhydro-cyclopenta[f][1]benzopyran is obtained which can be used without further purification.

To a solution of 450 mg. of the foregoing compound in 20 ml. of acetone, a solution of 0.95 g. of chromic acid in 6 ml. of 2 N sulfuric acid is added during 10 minutes with stirring at 10°. The reaction mixture is then stirred at 10° for 2 hours, poured onto ice-water and extracted with ether. The ethereal solution is washed neutral with water, dried over sodium sulfate and evaporated in vacuum. Recrystallized from ether, the residue yields 1-(1-acetoxyethyl)-7a-methyl-5-oxo-4-(3-oxopentyl)-hexahydroindane.

Another possibility to prepare the same product is the following:

As described below (see Example 9), the methyl ester of 1-acetyl-4-(2-carboxyethyl)-7a-methyl - 5 - oxo-hexahydroindane is prepared using an ethereal solution of diazomethane. A solution of 14 g. of this product in 500 ml. of benzene is treated with 500 mg. of p-toluenesulfonic acid monohydrate and 30 ml. of ethyleneglycol and boiled at the water-separator with stirring for 60 minutes. After cooling, the reaction mixture is washed with 100 ml. of 5 percent sodium hydrogen carbonate solution, then with a total of 300 ml. of water and dried over sodium sulfate. After filtration and concentration in water-pump vacuum, 1-acetyl-5,5-ethylenedioxy-4-(2-carbomethoxyethyl)-7a-methyl-hexahydroindane is obtained.

A solution of 12 g. of this product in 100 ml. of methanol is treated under ice-cooling within 5 minutes with a total of 4 g. of sodium borohydride and the mixture is stirred at room temperature for a further 60 minutes. It is then concentrated to half in water-pump vacuum and the residue is poured onto 250 ml. of ice-cold 1 N hydrochloric acid. The oily fractions are taken up in ether and the extract is concentrated in water-pump vacuum. The residue is dissolved in 50 ml. of dioxane, 100 ml. of 2 N hydrochloric acid are added and the mixture is subsequently heated in a bath of 80° for 16 hours. The reaction mixture is then concentrated to 40 ml. in water-pump vacuum, subsequently diluted with 150 ml. of water and subsequently extracted with ether. The organic extract is washed with water and dried over anhydrous sodium sulfate. After filtration and concentration of the filtrate in water-pump vacuum, 4-(2-carboxyethyl)-1-(1-hydroxyethyl) - 7a - methyl - 5 - oxo-hexahydroindane remains as the residue.

A solution of 13.4 g. of 4-(2-carboxyethyl)-1-(1-hydroxyethyl) - 7a-methyl - 5 - oxo-hexahydroindane and 4 g. of sodium acetate in 250 ml. of acetic anhydride is boiled at reflux under nitrogen for 4 hours. The acetic anhydride is removed in vacuum, the residue twice evaporated with toluene and finally taken up in 750 ml. of methylene chloride. The methylene chloride solution is washed five times with water, dried over $Na_2SO_4$ and evaporated in vacuum. The resulting 7-(1-acetoxyethyl)-6a-methyl-3(2H) - oxo - 1,6,6a,7,8,9,9a,9b-octahydrro-cyclopenta[f][1]benzopyran is directly employed in the next step.

A solution of 8.8 g. of 7-(1-acetoxyethyl)-6a-methyl-3(2H) - oxo - 1,6,6a,7,8,9,9a,9b-octahydro1cyclopenta[f][1]benzopyran in 250 ml. of absolute ether is slowly treated with 60 ml. of a 0.5 N ethereal solution of ethyl magnesium bromide at −15°. After 24 hours, the reaction mixture is poured into ice-cold saturated ammonium chloride solution. The ethereal solution is washed with water (1×), ice-cold 0.5 N caustic potash (2×) and again with water (2×). The organic phase is dried over sodium sulfate, the solvent is removed in vacuum and the residue is filtered through a column of 25 g. of silica gel. 1 - (1-acetoxyethyl)-7a-methyl-5-oxo-4-(3-oxopentyl) hexahydroindane is obtained as an oil.

EXAMPLE 3

3-acetyl - 3a,6-dimethyl - 5 - oxo-1,2,3,3a, 4,5,8,9,9a,9b-decahydro - 7H - benz[e]indene is obtained by treatment of 1 - acetyl - 7a-methyl-5-oxo-4-(3-oxopentyl)-hexahydroindane with aqueous-methanolic caustic potash in accordance with Example 1.

The indane derivative which is used as starting material can be prepared by oxidation of 3-ethyl-3-hydroxy-7-(1-hydroxyethyl) - 6a - methyl - perhydro - cyclopenta[f][1]benzopyran (prepared as described in Example 2) with chromic acid in analogy to the procedure given in Example 2.

EXAMPLE 4

A Grignard solution is prepared from 1.15 g. of magnesium, 15 ml. of ether and 10 g. of ethyl bromide. The solution thus obtained is diluted with 40 ml. of ether and treated with 6 g. of dry cadmium chloride under a nitrogen atmosphere and with stirring. The mixture is then heated under reflux for 2 hours and, after cooling, filtered under nitrogen atmosphere. To 45 ml. of this solution, 690 mg. of 1 - (1,1-ethylenedioxyethyl)-4-(2-chlorocarbonylethyl) - 7a - methyl - 5 - methylene-hexahydroindane dissolved in 25 ml. of absolute benzene are added dropwise under nitrogen atmosphere. The reaction mixture is heated under reflux for 2.5 hours, then diluted with ice-water and extracted with ether. The ethereal solution is washed with ammonium chloride solution and water, dried over sodium sulfate and evaporated in vacuum. The residue is chromatographed on 18 g. of aluminum oxide (activity grade III), with hexane/benzene (1:1 to 1:3) pure 3-(1,1-ethylenedioxyethyl)-3a-methyl - 7 - oxo - 1,2,3,3a,4,5,8,9,9a,9b-decahydro-7H-benz[e]indene being eluted which is recrystallized from diisopropyl ether/hexane.

The indane derivative which is used as the starting material can be prepared as follows:

To a suspension of 29.2 g. of 7 - (1,1-ethylenedioxyethyl) - 6a - methyl - 3(2H) - oxo - 1,6,6a,7,8,9,9a,9b-octahydro-cyclopenta[f][1]benzopyran in 100 ml. of dioxan are added 220 ml. of 0.5 N caustic soda. The mixture is stirred until a clear solution has formed, which then is treated with ice-cold 1 N sulfuric acid under cooling with ice. The precipitate is taken up in 3 liters of methylene chloride. The organic phase is washed with a saturated aqueous solution of sodium chloride, dried over sodium sulfate and then evaporated in vacuum. The residue is dissolved in a little methylene chloride, crystallized from ether and yields 1-(1,1-ethylenedioxyethyl)-4-(2-carboxyethyl)-7a-methyl-5-oxo-hexahydroindane.

A solution of 6.2 g. of the foregoing compound in 80 ml. of methylene chloride and 4 ml. of methanol is treated with an ethereal solution of diazomethane at 4° up to a persistent yellow coloration of the solution, which then is stirred at room temperature for 45 minutes. Excess of diazomethane is removed in vacuum, the solution is diluted with 120 ml. of methylene chloride, washed with water, dried over sodium sulfate and evaporated to dryness in vacuum. The residue is dissolved in benzene/ether (15:1) and filtered over 40 g. of aluminum oxide (activity grade III). Evaporation of the solution to dryness yields 1-(1,1-ethylenedioxyethyl) - 4 - (2-carbomethoxyethyl)-7a-methyl-5-oxo-hexahydroindane.

A solution of 3.24 g. of the compound prepared hereinbefore in 50 ml. of absolute tetrahydrofuran is added under nitrogen to 20 ml. of a 0.75 molar solution of methylenetriphenylphosphorane in absolute dimethyl sulfoxide. After addition of another 30 ml. of tetrahydrofuran the reaction mixture is stirred at 50° for 24 hours, cooled, poured into ice-water and extracted with ether. The ethereal solution is washed with water, dried over sodium sulfate and evaporated to dryness in vacuum. The residue is dissolved in a small quantity of ether and treated with about the 10-fold amount of hexane. The solution thus obtained is filtered over 25 g. of aluminum oxide (activity grade I–II). The filtrate is evaporated, taken up in 150 ml. of dioxane, treated with 20 ml. of 3 N caustic potash and heated to 70° under nitrogen for 45 minutes. The solution is then poured onto ice-water and neutralized with dilute phosphoric acid at 0°. The solution is then extracted with chloroform, the chloroform solution washed with a 10% solution of sodium chloride, dried over sodium sulfate, and evaporated in vacuum, yielding 1-(1,1 - ethylenedioxyethyl)-4-(2-carboxyethyl)-7a-methyl-5-methylene-hexahydroindane.

A solution of 620 mg. of the compound prepared hereinbefore in 10 ml. of absolute benzene are stirred at 3° for an hour with 4.5 ml. of freshly distilled oxalyl chloride. The solvent is then evaporated in vacuum and the residue dried by repeated evaporation with benzene in vacuum. The oily 1 - (1,1 - ethylenedioxyethyl) - 4-(2-chlorocarbonylethyl)-7a-methyl - 5 - methylene - hexahydroindane thus obtained can be used without further purification.

EXAMPLE 5

3.08 g. of 1-(1,1-ethylenedioxyethyl)-4-(2 - carboxyethyl)-7a-methyl-5 - methylene - hexahydroindane (preparation see Example 4) are dissolved in 50 ml. of acetic anhydride and treated with 50 ml. of glacial acetic acid and 800 mg. of anhydrous zinc chloride. The reaction mixture is heated under reflux for 4 hours with vigorous stirring and under a nitrogen atmosphere. The solvent is then removed in vacuum, the residue dissolved in 100 ml. of acetone and, after the addition of 20 ml. of 2 N sulfuric acid, warmed to 40° for 30 minutes. The crude solution is poured onto a large amount of water and thereafter extracted with methylene chloride. The methylene chloride solution is successively washed with water, 5% sodium carbonate solution and water, dried over sodium sulfate and evaporated in vacuum. The residue is chromatographed on 100 g. of silica gel and recrystallized from diisopropyl ether. 3-acetyl-3a-methyl-7-oxo-1,2,3,3a, 4,5,8,9,9a,9b-decahydro-7H-benz[e]indene is obtained.

EXAMPLE 6

3.4 g. of 1-(1,1-ethylenedioxyethyl) - 4 - (2 - carbomethoxyethyl)-5-ethylidene-7a-methyl - hexahydroindane are dissolved in 100 ml. of glacial acetic acid/oron trifluoride and heated to 90°–95° under nitrogen for 2.5 hours. The reaction mixture is then treated with 10 ml. of 2 N sulfuric acid and warmed to 50° for 15 minutes. The cooled solution is poured onto 500 ml. of ice-water and extracted with methylene chloride. The organic phase is washed with 2 N caustic potash and subsequently with water, dried over sodium sulfate and evaporated in vacuum. The residue is taken up in 50 ml. of benzene and chromatographed on 120 g. of silica gel. Elution with benzene/acetone (10:1) yields 3-acetyl-3a,6-dimethyl-7-oxo-1,2,3, 3a,4,5,8,9,9a,9b-decahydro - 7H - benz[e]indene which is recrystallized from ether/hexane.

The indane derivative which is used as the starting material can be prepared as follows:

2.5 g. of sodium hydride (51% dispersion in mineral oil) are washed with absolute hexane under nitrogen. After removal of the hexane, 15 ml. of absolute dimethyl sulfoxide are added and the suspension is heated to 75° under nitrogen with stirring for 45 minutes. After cooling to room temperature, the solution is treated with a solution of 22.4 g. of ethyltriphenylphosphonium iodide in 100 ml. of absolute dimethyl sulfoxide. To the resulting deep-red solution is added a solution of 4.68 g. of 1 - (1,1 - ethylenedioxyethyl) - 4 - (2 - carbomethoxyethyl) - 7a - methyl-5-oxo-hexahydroindane (prepared by treatment of 1-(1,1-ethylenedioxyethyl) - 4 - (2 - carboxyethyl)-7a-methyl-5 - oxo - hexahydroindane, mentioned in Example 4, with diazomethane) in 100 ml. of absolute dimethyl sulfoxide. The reaction mixture is warmed to 65° under nitrogen atmosphere overnight. After cooling, it is poured onto ice-water and extracted with ether/methylene chloride (4:1). The organic phase is washed with water, dried over sodium sulfate and evaporated in vacuum. The syrupy residue is taken up in petroleum ether/ether 10:1 and chromatographed on 30 g. of aluminum oxide (activity grade I–II). Elution with petroleum ether/ether (10:1 to 6:1) yields oily 1-(1,1-ethylenedioxyethyl)-4-(2 - carbomethoxyethyl) - 5-ethylidene-7a - methylhexahydroindane as a mixture of isomers.

EXAMPLE 7

A solution of 3.38 g. of 1-(1,1-ethylenedioxyethyl)-4-(2-carboxyethyl)-5-ethylidene-7a - methyl - hexahydroindane in 50 ml. of methylene chloride is slowly added to 20 ml. of 83–85% polyphosphoric acid while stirring vigorously. The reaction mixture is warmed to 30° and the methylene chloride is slowly drawn off in vacuum. The syrupy residue is warmed to 55° for 16 hours, then under strong ice-cooling is diluted with ice-water, treated with 200 ml. of acetone and heated to 50° for 30 minutes. The reaction mixture is extracted with methylene chloride, the organic solution is worked up and the residue thus obtained taken up in 90 ml. of 96% alcohol. 12 ml. of glacial acetic acid and 2 g. of semicarbazide are added to the alcoholic solution, the mixture then being boiled under reflux for 2 hours. The precipitate obtained on cooling is dissolved in 150 ml. of ethanol, the solution is heated under reflux for 1 hour and then evaporated until crystallization begins. The crystallized disemicarbazone is dissolved in 150 ml. of glacial acetic acid and 50 ml. of water, the solution is treated with 13 ml. of a 1.66 N succinic acid solution and warmed to 40° for 3 hours. After standing overnight, the solution is diluted with 3 liters of ether and the ethereal solution is washed with water, 2 N sodium carbonate solution and water. After drying over sodium sulfate and evaporation, the residue is dissolved in a small quantity of methylene chloride and crystallized from heptane. 3-acetyl-3a,6-dimethyl-7-oxo-1,2,3,3a,4,5,8,9,9a,9b - decahydro-7H-benz-[e]indene is obtained.

The indane derivative used as the starting material can be obtained by treatment of a solution of the corresponding methyl ester in dioxane with 20% aqueous caustic potash. The preparation of the methyl ester itself has already been described in Example 6.

EXAMPLE 8

278 mg. of 1-acetyl-5-ethylidene-4-(2 - carboxyethyl)-7a-methyl - hexahydroindane are dissolved in 5 ml. of acetic anhydride. The solution is treated with 0.7 ml. of concentrated sulfuric acid and heated under reflux for 1 hour. After cooling 2 ml. of water are added to the solution, the mixture is stirred at 90° for 1 hour, then cooled, diluted with 100 ml. of water and extracted with methylene chloride. The organic phase is washed neutral, dried over sodium sulfate and evaporated in vacuum. The residue is chromatographed on 5 g. of silica gel with benzene/acetone (10:1), yielding 3-acetyl-3a,6-dimethyl-7-oxo-1,2,3,3a,4,5,8,9,9a,9b - decahydro - 7H - benz[e] indene.

The indane derivative which is used as starting material can be prepared by treatment of 1-(1,1-ethylenedioxyethyl)-5-ethylidene-4-(2-carboxyethyl) - 7a - methyl-hexahydroindane with 2 N sulfuric acid in acetone.

EXAMPLE 9

A solution of 1.39 g. of 1-acetyl-7a-methyl-5-oxo-4-(3-oxopentyl)-hexahydroindane in 10 ml. of ethanol is treated with 1 ml. of pyrrolidine under a nitrogen atmosphere. The solution is stirred at 48° for 24 hours, then treated with 40 ml. of 2.5 N hydrochloric acid and stirred for another 4 hours under nitrogen, diluted with 100 ml. of water and extracted with methylene chloride. The organic phase is washed with hydrochloric acid and subsequently with water, dried over sodium sulfate and evaporated in vacuum. The residue is chromatographed on 30 g. of silica gel with benzene/acetone (10:1) 3-acetyl-3a,6-dimethyl-7-oxo - 1,2,3,3a,4,5,8,9,9a,9b - decahydro-7H-benz[e]indene being eluted with is recrystallized from ether/hexane.

The starting material can be prepared as follows:

(a) To a solution of 13.3 g. of 1-acetyl-4-(2-carboxyethyl)-7a-methyl-5 - oxo - hexahydroindane in 20 ml. of methylene chloride, 80 ml. of 5% ethereal diazomethane solution are added dropwise within 15 minutes. The mixture is allowed to stand at room temperature for 60 minutes, is then treated with 2 ml. of glacial acetic acid, 10 minutes later washed with an aqueous solution of sodium hydrogen carbonate and water, dried over sodium sulfate and evaporated. 1-acetyl-4-(2-carbomethoxyethyl) - 7a-methyl-5-oxo-hexahydroindane is obtained.

(b) To a solution of 13.3 g. of 1-acetyl-4-(2-carboxyethyl)-7a-methyl-5-oxo-hexahydroindane in 100 ml. of absolute methanol, 40 g. of 10% methanolic hydrochloric acid is added. The reaction mixture is boiled under reflux for 60 minutes, then is concentrated in vacuum and the residue taken up in 200 ml. of ether. The ethereal solution is washed with a saturated solution of sodium hydrogen carbonate and water, dried and concentrated. 1-acetyl-4-(2-carbomethoxyethyl)-7a-methyl-5-oxo-hexahydroindane is obtained.

A solution of 14 g. of the ester, the preparation of which is described hereinbefore, in 600 ml. of anhydrous benzene is heated under reflux for 30 hours together with 25 ml. of ethylene glycol and 1 g. of p-toluenesulfonic acid monohydrate, the water formed being removed in a Soxhlet apparatus by 80 g. of calcium carbide. The reaction mixture is then treated with 3 ml. of pyridine and concentrated in water-pump vacuum. The residue thus obtained is dissolved in 100 ml. of dioxane treated with 50 g. of 20% aqueous caustic potash and heated to reflux for 2 hours. The reaction mixture is then concentrated in vacuum, the residue taken up in 100 ml. of water, the aqueous solution is treated with 9.5 g. of glacial acetic acid under ice-cooling, the separating oil is taken up in ether, the ethereal solution is washed with water, dried over magnesium perchlorate and evaporated, yielding 5,5-ethylenedioxy-1-(1,1-ethylenedioxyethyl)-4-(2 - carboxyethyl)-7a-methyl-hexahydroindane.

To a solution of 355 mg. of 5,5-ethylenedioxy-1-(1,1-ethylenedioxyethyl)-4-(2-carboxyethyl)-7a-methyl - hexahydroindane in 25 ml. of methylene chloride, 150 mg. of chlorosulfonyl isocyanate in 5 ml. of methylene chloride are added at room temperature with stirring and are warmed to 40–50° for 30 minutes. After cooling to 15°, 0.5 ml. of dimethylformamide are added. The reaction mixture is stirred for another 30 minutes, then diluted with ice-water and extracted with ether/methylene chloride 5:1. The organic phase is washed with 2 N caustic potash and thereafter neutral with water, dried over sodium sulfate and evaporated. The oily residue is taken up in methylene chloride and chromatographed on 15 g. of silica gel with benzene/ether. The eluate is concentrated and the residue dried in high vacuum. 5,5-ethylenedioxy-1-(1,1-ethylenedioxyethyl)-4-(2-cyanoethyl)-7a - methyl-hexahydrodroindane is obtained.

To a solution of 670 mg. of 5,5-ethylenedioxy-1-(1,1-ethylenedioxyethyl)-4-(2-cyanoethyl)-7a-methyl-hexahydroindane in 40 ml. of absolute ether, an ethereal solution of ethyl magnesium iodide (prepared from 2.5 g. of magnesium and 7.5 ml. of ethyl iodide in 20 ml. of ether) is added dropwise within 20 minutes at 10°. The reaction mixture is heated under reflux for 7 hours and then treated with 35 ml. of glacial acetic acid in 25 ml. of ether with ic-cooling. The reaction mixture is then concentrated to remove the ether, treated with water, stirred for 2 hours at 15°, diluted with a large amount of water and extracted with methylene chloride. The organic phase is washed with a saturated solution of sodium chloride, dried over sodium sulfate and evaporated. 5,5-ethylenedioxy-1-(1,1-ethylenedioxyethyl)-7a-methyl-4-(3-oxopentyl) - hexahydroindane is obtained. By treatment with p-toluenesulfonic acid in acetone this diketal can be converted into 1-acetyl-7a-methyl-5-oxo-4-(3-oxopentyl)-hexahydroindane.

EXAMPLE 10

1.75 ml. of concentrated hydrochloric acid are added to a solution of 1.23 g. of 1-acetyl-7a-methyl-5-oxo-4-(3-oxoheptyl)-hexahydroindane in 25 ml. of glacial acetic acid, and the mixture is stirred under nitrogen at room temperature for 21 hours. The solution is then cautiously added to 160 ml. of 5% aqueous solution of sodium carbonate and stirred for 2 hours with ice-cooling. The precipitate is filtered off, washed with water, and left to dry. It is then dissolved in 12 ml. of methylene chloride and filtered over 15 g. of silica gel to give 3-acetyl-3a-methyl-7 - oxo - 6 - propyl-1,2,3,3a,4,5,8,9,9a,9b-decahydro-7H-benz[e] indene.

The starting material can be prepared as follows:

36.84 g. of 5,5-ethylenedioxy-1-(1,1-ethylenedioxyethyl)-4-(2-carbomethoxyethyl)-7a - methyl - hexahydroindane (obtained by ketalization in the usual way of 1-(1,1-ethylenedioxyethyl)-4-(2 - carbomethoxyethyl) - 7a-methyl-5-oxohexahydroindane mentioned already in Example 6) are dissolved in methanol. The solution is treated with 0.8 mole of aqueous concentrated ammonia, allowed to stand at room temperature for 3 days, and yields on concentration 1-(1,1-ethylenedioxyethyl)-5,5-ethylenedioxy-4-(2-carbaminoethyl)-7a-methyl-hexahydroindane. Tetrahydrofuran is added to 34.24 g. of this acid amide at 50° under an argon atmosphere until solution takes place. To this solution is added dropwise a 3-molar solution of butyl magnesium bromide in tetrahydrofuran with subsequent stirring at 50° for 24 hours. The Grignard complex is then decomposed by addition of an ice-cold saturated solution of ammonium chloride and the solution is extracted with ether. Working up of the ethereal solution yields 5,5-ethylenedioxy-1-(1,1-ethylenedioxyethyl) - 7a-methyl-4-(3-oxoheptyl)-hexahydroindane. This keto-diketal can be converted into the triketone, which is 1-acetyl-7a-methyl-5-oxo-4-(3-oxoheptyl)-hexahydroindane, by treatment with p-toluenesulfonic acid in acetone.

EXAMPLE 11

(a) A solution of 4.38 g. of 1-acetyl-7a-methyl-5-oxo-4-(3-oxohexyl)-hexahydroindane and 5 g. of potassium hydroxide in 50 ml. of ethanol and 11 ml. of water is stirred at room temperature under nitrogen for 3 hours. The solution is then diluted with a large amount of ice-water and extracted with ether/methylene chloride (6:1). The organic phase is washed with a saturated aqueous solution of sodium chloride, dried over sodium sulfate and evaporated in vacuum. The residue is dissolved in 20 ml. of methylene chloride and chromatographed on 100 g. of silica gel. At first the non-polar byproducts are eluted with hexane/methylene chloride, later on there is eluted 3-acetyl-6-ethyl-3a-methyl-7-oxo-1,2,3,3a,4,5,8,9,9a,9b-decahydro-7H-benz[e]indene with methylene chloride/ether (8:1) which compound is recrystallized from methylene chloride/diisopropyl ether with the addition of a small quantity of pentane.

(b) To a solution of 2.92 g. of 1-acetyl-7a-methyl-5-oxo-4-(3-oxobutyl)-hexahydroindane in 250 ml. of absolute benzene is added 180 mg. of p-toluenesulfonic acid monohydrate. The reaction mixture is heated to boiling under an argon atmosphere then subjected to an azeotropic distillation, at first 60 ml. of benzene being distilled off and the benzene distilling off in the course of the further distillation being replaced by dropwise addition of fresh benzene. After 3 hours, the reaction mixture is cooled, poured onto an ice-cold 4% aqueous solution of sodium hydrogen carbonate and extracted with ether. The ethereal phase is washed with water, dried over sodium sulfate and evaporated in vacuum. Working up in accordance with the process describtd in paragraph (a) yields 3-acetyl-3a-methyl-7-oxo-1,2,3,3a,4,5,8,9a,9b-decahydro - 7H - benz[e]indene.

The starting material for (a) can be prepared as follows:

To a solution of 3.54 g. of 5,5-ethylenedioxy-1-(1,1-ethylenedioxyethyl)-4-(2-carboxyethyl)-7a-methyl - hexahydroindane (preparation see Example 9) in absolute benzene is added 0.6 ml. of phosphorus trichloride at 6°. The mixture is allowed to stand at this temperature under nitrogen for 3 hours. Then the benzene solution is separated from phosphorus oxychloride by decantation and evaporated to dryness in vacuum. The residue is evaporated again with another 25 ml. of benzene and the oily 5,5-ethylenedioxy-1-(1,1-ethylenedioxyethyl)-4 - (2 - chlorocarbonylethyl)-7a-methyl-hexahydroindane is dried in high vacuum.

An ethereal solution of 3.73 g. of 5,5-ethylenedioxy-1-(1,1-ethylenedioxyethyl) - 4 - (2-chlorocarbonylethyl)-7a-methylhexahydroindane is added to a solution of 430 mg. of ethyleneimine and 1.01 g. of triethylamine in 20 ml. of absolute ether under a nitrogen atmosphere. The solution is stirred at 0° for 2 hours, filtered off from triethylammonium hydrochloride which separates out and to the filtrate is added an ethereal solution of 380 mg. of lithium aluminum hydride under nitrogen. The solution is stirred at 5° for 2 hours, cooled to −20° and treated with 1.3 ml. of a saturated solution of sodium sulfate. The solution is allowed to warm slowly and is finally heated under reflux for 30 minutes. The precipitate is filtered off and washed with methylene chloride. The filtrate and the methylene chloride liquors are combined, washed with water, dried over sodium sulfate and evaporated. The oily residue is dissolved in benzene and a small quantity of methylene chloride and filtered over 20 g. of silica gel. Concentration of the filtrate yields 5,5-ethylenedioxy-1-(1,1 - ethylenedioxyethyl)-4-(2-formylethyl)-7a-methyl-hexahydroindane.

A solution of 440 mg. of n-propyl magnesium bromide in 10 ml. of absolute ether is added with good stirring at −20° to a solution of 746 mg. of 5,5-ethylenedioxy-1(1,1-ethylenedioxyethyl) - 4 - (2-formylethyl)-7a-methyl-hexahydroindane in 20 ml. of absolute tetrahydrofuran. After 1 hour, the cooling bath is removed and the temperature is allowed to rise to 15°. The reaction mixture is poured into ice-cold ammonium chloride solution and extracted with methylene chloride. The organic phase is washed with 2 N caustic potash and water, dried over sodium sulfate and evaporated to dryness in vacuum. The oily residue is dissolved in 30 ml. of acetone, treated with 2 ml. of 2 N sulfuric acid and heated to 45° for 30 minutes. After dilution with 500 ml. of water, the mixture is extracted with methylene chloride, the organic phase is washed with 1 N caustic potash and water, dried and evaporated in vacuum. The oily residue is chromatographed on 35 g. of aluminum oxide (activity III). Oily 7-acetyl-4a-hydroxy-6a-methyl - 3 - propylperhydro-cyclopenta[f][1]benzopyran is eluted with hexane/ether (2:1 and 1:1) and pure ether.

Within 20 minutes a solution of 816 mg. of chromic acid in 5 ml. of 6 N sulfuric acid is added to a solution of 480 mg. of 7 - acetyl-4a-hydroxy-6a-methyl-3-propylperhydro-cyclopenta[f][1]benzopyran in 10 ml. of acetone with stirring at 20°. The solution is stirred at 20° for 3 hours, then treated with 1 ml. of ethanol and poured into 150 ml. of water. The reaction mixture is extracted with methylene chloride, the organic phase is washed with water, dried over sodium sulfate and evaporated to dryness in vacuum. The residue is chromatographed on 24 g. of silica gel, 1-acetyl-7a-methyl-5-oxo-4-(3-oxohexyl)-hexahydroindane being eluted with hexane/diisopropyl ether (1:1 and 1:2).

The same product can also be prepared in the following manner:

2.25 ml. of a 1.35 molar solution of aluminum diisobutyl hydride is added dropwise to a solution of 1 g. of 5,5-ethylenedioxy-1-(1,1-ethylenedioxyethyl) - 4 - (2-cyanoethyl)-7a-methyl-hexahydroindane (obtained from 5,5-ethylenedioxy-1-(1,1-ethylenedioxyethyl) - 4 - (2-carboxyethyl)-7a-methylhexahydroindane as is described in Example 9) in n-heptane under nitrogen atmosphere at −10°. After 5 minutes, there are added dropwise 0.3 ml. of a saturated sodium sulfate solution and then 15 g. of solid sodium sulfate. After addition of 150 ml. of methylene chloride the mixture is stirred for 60 minutes and filtered, the filter cake being washed with methylene chloride. The filtrate and the wash-liquid are combined and evaporated to dryness. The oily residue is dissolved in a small quantity of ethanol, treated with saturated aqueous sodium sulfite solution and stirred at 15° for 25 minutes. The reaction mixture is cooled and filtered. The precipitate is shaken with 50 ml. of 10% caustic soda and extracted with ether. The ethereal solution is washed with a saturated aqueous solution of sodium chloride, dried over sodium sulfate and evaporated in vacuum, yielding 5,5 - ethylenedioxy-1-(1,1-ethylenedioxyethyl)-4-(2-formylethyl)-7a-methyl-hexahydroindane.

EXAMPLE 12

1-acetyl-7a-methyl-5-oxo - 4 - (3-oxobutyl)-hexahydroindane is treated with aqueous ethanolic caustic potash in accordance with Example 11, paragraph (a), yielding 3-acetyl-3a-methyl - 7 - oxo-1,2,3,3a,4,5,8,9,9a,9b-decahydro-7H-benz[e]indene.

The starting material can be prepared as follows:

(a) To 34.24 g. of 5,5-ethylenedioxy-1-(1,1-ethylenedioxyethyl)-4-(2-carbaminoethyl - 7a - methyl-hexahydroindane (see Example 10) tetrahydrofuran is added at 50° under an argon atmosphere until solution takes place. To this solution there is added dropwise a 3-molar solution of methyl magnesium bromide in tetrahydrofuran. The mixture is then stirred at 50° for 24 hours. The Grignard complex is decomposed by addition of an ice-cooled saturated aqueous solution of ammonium chloride and the reaction product is extracted with ether. Working up of the ethereal solution yields 5,5-ethylenedioxy-1-(1,1-ethylenedioxyethyl) - 7a - methyl-4-(3-oxobutyl)-hexahydroindane. The analogous reaction with ethyl magnesium bromide leads to a homologous compound.

35.24 g. of 5,5-ethylenedioxy-1-(1,1-ethylenedioxyethyl)-7a-methyl - 4 - (3-oxobutyl)-hexahydroindane are treated with acetone until solution takes place. To this solution such an amount of water is added as is possible without causing turbidity. Then 1.5 g. of p-toluenesulfonic acid monohydrate are added and the reaction mixture is stirred at room temperature until no more diketal is detectable on the thin layer chromatogram. The reaction mixture is neutralized with a saturated solution of sodium bicarbonate and treated dropwise with 1 liter of water, yielding 1-acetyl-7a-methyl-5-oxo-4-(3-oxobutyl)-hexahydroindane as a precipitate which can be recrystallized from ether/hexane.

(b) To 20 ml. of a 1-molar ethereal solution of cadmium-dimethyl a solution of 750 mg. of 5,5-ethylenedioxy-1-(1,1-ethylenedioxyethyl) - 4 - (2-chlorocarbonylethyl)-7a-methylhexahydroindane (see Example 11) in 25 ml. of absolute benzene is added and the mixture heated under reflux for 2 hours. After cooling, the solution is poured onto 500 ml. of ice-water and extracted with ether/methylene chloride (4:1). The organic phase is washed with water, dried over sodium sulfate and evaporated in vacuum. The 5,5-ethylenedioxy-1-(1,1-ethylenedioxyethyl) - 7a - methyl-4-(3-oxobutyl)-hexahydroindane which is thus obtained is further reacted as described in paragraph (a).

(c) To a solution of 1.4 g. of methyl-lithium in 50 ml. of absolute ether a solution of 10.5 g. of 5,5-ethylenedioxy-1-,1,1-ethylenedioxyethyl) - 4 - (2-carboxyethyl-7a-methylhexahydroindane in 300 ml. of absolute ether is added within 25 minutes under nitrogen atmosphere. The mixture is stirred for a further 20 minutes, then poured onto ice and the organic phase separated. After washing with a total of 500 ml. of water, the ethereal solution is dried over anhydrous sodium sulfate. Filtration and concentration in a water-pump vacuum yields 5,5-ethylenedioxy-1-(1,1-ethylenedioxyethyl) - 7a - methyl-4-(3-oxobutyl)-hexahydroindane which is further reacted as described under (a).

EXAMPLE 13

A solution of 18.8 of desA-9,10-seco-25D-spirostane-5,9-dione and 16.8 g. of potassium hydroxide in 200 ml. of rectified spirit and 45 ml. of water is stirred at room temperature under nitrogen atmosphere for 3 hours. The reaction solution is then poured onto 2 liters of ice-water and extracted with 2 liters of methylene chloride. The organic phase is washed with saturated aqueous sodium chloride solution, dried over sodium sulfate and evaporated in vacuum. The residue is chromatographed on 600 g. silica gel. Elution with benzene/cyclohexane/ether (10:10:1) yields desA-25D-spirost-9-en-5-one which is recrystallized from acetone/hexane.

The starting material can be prepared as follows:

A mixture of 400 ml. of acetic ester, 0.5 ml. of 72% perchloric acid and 48 ml. of acetic anhydride is made up to 500 ml. with acetic ester. 400 ml. of this solution are stirred under nitrogen at room temperature for 25 minutes with 7.28 g. of desA-19-nor-5,9 - seco - 25D - spirostan-9-one-5-carboxylic acid and then poured into 300 ml. of a cold saturated aqueous solution of sodium hydrogen carbonate. The acetic ester layer is separated, washed with water, dried over sodium sulfate and concentrated in vacuum. The residue is treated with benzene and again evaporated to dryness in vacuum. The residue is dissolved in benzene/ether and filtered over 80 g. of silica gel. Concentration of the solution yields desA-19-nor-10-oxa-25D-spirost-9(11)-en-5-one which is further used without purification.

55 ml. of a 2 molar ethereal solution of ethyl magnesium bromide are treated dropwise at −70° and under stirring with a solution of 34.6 g. of the compound prepared as described above in 250 ml. of tetrahydrofuran. The reaction mixture is stirred at −50 to −60° under nitrogen for 2.5 hours and then is slowly warmed to 0°. The solution is then poured onto an ice-cold saturated ammonium chloride solution and treated with 1.75 liters of ether. The organic phase is separated, washed with a cold aqueous solution of sodium hydrogen sulfate and water, dried over sodium sulfate and evaporated in vacuum. The residue is dissolved in methylene chloride and filtered over 35 g. of silica gel. The oily desA-9,10-seco-25D-spirostane-5,9-dione obtained on evaporation of the filtrate is employed for the cyclization without further purification.

We claim:
1. A compound of the formula

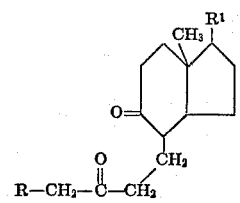

wherein R is selected from the group consisting of hydrogen or $C_{1-7}$ alkyl and $R^1$ is selected from the group consisting of acetyl, 1-hydroxy-ethyl, 1-acetyloxy-ethyl, benzoyloxy-ethyl, or 1,1-ethylenedioxy-ethyl.

References Cited
UNITED STATES PATENTS
3,692,803    9/1972    Hajos _____ 260—340.9

DONALD G. DAUS, Primary Examiner

J. H. TURNIPSEED, Assistant Examiner

U.S. Cl. X.R.

260—343.2 R, 345.3, 345.9, 376 C, 488 B, 514 R, 586 H